US009002379B1

(12) United States Patent
Yang et al.

(10) Patent No.: US 9,002,379 B1
(45) Date of Patent: Apr. 7, 2015

(54) GROUPS SURROUNDING A PRESENT GEO-SPATIAL LOCATION OF A MOBILE DEVICE

(71) Applicants: Mary Yang, Palo Alto, CA (US); Matthew Murphy, Belmont, CA (US)

(72) Inventors: Mary Yang, Palo Alto, CA (US); Matthew Murphy, Belmont, CA (US)

(73) Assignee: Appsurdity, Inc., Redwood Shores, CA (US)

( * ) Notice: Subject to any disclaimer, the term of this patent is extended or adjusted under 35 U.S.C. 154(b) by 0 days.

(21) Appl. No.: 14/187,349

(22) Filed: Feb. 24, 2014

(51) Int. Cl.
H04W 24/00 (2009.01)
H04W 4/02 (2009.01)
H04W 12/08 (2009.01)
H04W 4/08 (2009.01)
H04W 4/12 (2009.01)
H04L 29/08 (2006.01)

(52) U.S. Cl.
CPC .............. *H04W 4/022* (2013.01); *H04W 12/08* (2013.01); *H04W 4/08* (2013.01); *H04W 4/12* (2013.01); *H04L 67/18* (2013.01); *H04L 67/104* (2013.01)

(58) Field of Classification Search
CPC ....................................................... H04W 4/02
USPC ........................... 455/456.1, 519; 340/539.13
See application file for complete search history.

(56) References Cited

U.S. PATENT DOCUMENTS

| | | | |
|---|---|---|---|
| 5,214,789 A * | 5/1993 | George | ........................ 455/440 |
| 5,526,345 A | 6/1996 | Wallmeier | |
| 6,073,108 A | 6/2000 | Peterson | |
| 6,249,252 B1 | 6/2001 | Dupray | |
| 6,549,768 B1 | 4/2003 | Fraccaroli | |
| 7,069,308 B2 | 6/2006 | Abrams | |
| 7,110,858 B2 | 9/2006 | Pisarsky | |
| 7,117,254 B2 | 10/2006 | Lunt et al. | |
| 7,392,042 B2 * | 6/2008 | Bates et al. | ................ 455/414.2 |
| 7,535,369 B2 | 5/2009 | Fong et al. | |
| 7,538,667 B2 | 5/2009 | Koen | |
| 7,590,691 B2 | 9/2009 | Gonsalves et al. | |
| 7,593,740 B2 | 9/2009 | Crowley et al. | |
| 7,672,877 B1 | 3/2010 | Acton et al. | |
| 7,793,211 B2 | 9/2010 | Brenner | |
| 7,797,001 B2 | 9/2010 | Seligmann | |
| 7,813,741 B2 | 10/2010 | Hendrey et al. | |
| 7,818,016 B2 | 10/2010 | Ahn | |
| 7,848,905 B2 | 12/2010 | Troxler et al. | |
| 7,890,124 B2 | 2/2011 | Smith et al. | |
| 7,940,173 B2 | 5/2011 | Koen | |
| 7,949,103 B2 | 5/2011 | Sapp et al. | |
| 8,032,126 B2 | 10/2011 | Fraccaroli | |
| 8,159,342 B1 | 4/2012 | Medina, III et al. | |
| 8,200,248 B2 | 6/2012 | Ioppe et al. | |

(Continued)

*Primary Examiner* — Charles Shedrick
(74) *Attorney, Agent, or Firm* — Raj Abhyanker, P.C.

(57) ABSTRACT

A method, apparatus, and system of interaction between groups surrounding a present geo-spatial location of a mobile device are disclosed. In one embodiment, a method of a geo-spatial groups server includes verifying a particular user based on a verification code of the particular user placed through a mobile device communicatively coupled to the geo-spatial groups server. The method creates a group tied to geo-spatial vicinity surrounding a current geo-spatial location of the mobile device. The method associates a name identifier to the group and also permits a different user in the geo-spatial vicinity surrounding the current geo-spatial location of the mobile device to access the group. Further, the method automatically denies a requester user access to the group when the requestor user is outside an outer boundary of the geo-spatial vicinity surrounding the current geo-spatial location of the mobile device.

20 Claims, 8 Drawing Sheets

(56) References Cited

U.S. PATENT DOCUMENTS

| | | |
|---|---|---|
| 8,204,513 B2 * | 6/2012 | Crowley et al. ............ 455/456.3 |
| 8,335,519 B2 | 12/2012 | Peterson et al. |
| 8,351,953 B2 | 1/2013 | Khanka et al. |
| 8,385,964 B2 | 2/2013 | Haney |
| 8,412,234 B1 | 4/2013 | Gatmir-Motahari et al. |
| 8,525,683 B2 | 9/2013 | Fong et al. |
| 2003/0200192 A1 | 10/2003 | Bell et al. |
| 2003/0216960 A1 | 11/2003 | Postrel |
| 2004/0160652 A1 | 8/2004 | Kimura et al. |
| 2005/0113123 A1 * | 5/2005 | Torvinen ....................... 455/519 |
| 2005/0250516 A1 | 11/2005 | Shim |
| 2006/0064346 A1 | 3/2006 | Steenstra et al. |
| 2006/0080283 A1 | 4/2006 | Shipman |
| 2009/0029717 A1 * | 1/2009 | Bates et al. ................ 455/456.1 |
| 2009/0125321 A1 | 5/2009 | Charlebois et al. |
| 2009/0125584 A1 * | 5/2009 | Agrawala et al. ............. 709/203 |
| 2010/0246468 A1 * | 9/2010 | Santhanam et al. .......... 370/312 |
| 2010/0248742 A1 * | 9/2010 | Song et al. ................. 455/456.1 |
| 2011/0214718 A1 | 9/2011 | Hayashi |
| 2011/0260860 A1 * | 10/2011 | Gupta ...................... 340/539.13 |
| 2012/0157122 A1 | 6/2012 | Niranjan et al. |
| 2012/0290405 A1 | 11/2012 | Talluri |
| 2012/0290950 A1 | 11/2012 | Rapaport et al. |
| 2012/0323689 A1 | 12/2012 | Metcalf et al. |
| 2013/0012242 A1 | 1/2013 | Nag et al. |
| 2013/0040649 A1 | 2/2013 | Soto Matamala et al. |
| 2013/0066964 A1 | 3/2013 | Odio et al. |
| 2013/0110927 A1 | 5/2013 | Marra et al. |
| 2013/0321168 A1 | 12/2013 | Mahony et al. |

* cited by examiner

| GROUP NAME 700 | DESCRIPTION 702 | MEMBER COUNT 704 | LATITUDE 706 | LONGITUDE 708 |
|---|---|---|---|---|
| WEST VALLEY | ≡≡≡ | 64 | X | Y |
| TORADO RESTAURANT | ≡≡≡ | 37 | M | N |
| • | • | • | • | • |
| • | • | • | • | • |
| • | • | • | • | • |
| • | • | • | • | • |

INITIAL WRITE UP 406 (pointing to DESCRIPTION 702)

FIGURE 7

GROUPS SURROUNDING A PRESENT GEO-SPATIAL LOCATION OF A MOBILE DEVICE

FIELD OF TECHNOLOGY

This disclosure relates generally to the technical fields of communications and, in one example embodiment, to a method, apparatus, and system of interaction between groups surrounding a present geo-spatial location of a mobile device.

BACKGROUND

A group may be a number of people who are connected by some shared activity, interest, and/or quality. The group may desire to grow their membership. However, the group may not know the best way to attract new members to the group. Recruited members to the group may live and/or work too far away from where the group regularly meets to attend meetings and/or participate in the group.

As a result, the group may not be able to grow their membership and fail to attract enough members to continue existing. For this reason, the group may prefer attracting members that are physically proximate to where the group meets. Attracting such members may be difficult, time consuming, and impractical. Therefore, the group may fail to thrive.

SUMMARY

Disclosed are a method, a device and/or a system of interaction between groups surrounding a present geo-spatial location of a mobile device.

In one embodiment, a method of a geo-spatial groups server includes verifying a particular user based on a verification code of the particular user placed through a mobile device communicatively coupled to the geo-spatial groups server. The method creates a group tied to geo-spatial vicinity surrounding a current geo-spatial location of the mobile device. The method associates a name identifier to the group and also permits a different user in the geo-spatial vicinity surrounding the current geo-spatial location of the mobile device to access the group. Further the method automatically denies a requester user access to the group when the requestor user is outside an outer boundary of the geo-spatial vicinity surrounding the current geo-spatial location of the mobile device.

The method may permit the different user to communicate with the particular user through the group. The method may add the different user to the group and may open a group chat session between the different user and other members of the group while the different user is in the geo-spatial vicinity surrounding the group tied to the geospatial vicinity. The method may also permit a private conversation between the different user and other members of the group. Further the method may permit the different user to mute the particular user, a thread and/or a topic in the group.

The method may generate an access pin of the group and may permit the different user to enter the access pin to access the group even when the user is not in the geo-spatial vicinity surrounding the group tied to the geo-spatial vicinity when the group is a public group. The method may also permit the different user to enter the access pin to find the group even when the user is not in the geo-spatial vicinity surrounding the group tied to the geo-spatial vicinity when the group is a private group. The method may be responsive to the particular user and any number of other users and individuals that have downloaded an application associated with the geo-spatial group server to add each other to respective contact lists in each other's mobile devices when each user depresses a huddle indicator on their respective mobile devices simultaneously and are in a maximum five yard distance from each other. The method may automatically permit the administrator user to add other users that have depressed a fast join button on the application when the other users are in the maximum five yards distance from a location of the administrator user.

The method may generate messages to members of the group only when the members are in the geo-spatial vicinity of the group. The method may distribute the messages to members of the group when the members of the group are in the geo-spatial vicinity of the group and may withhold the messages to members of the group when the members of the group are outside the geo-spatial vicinity of the group. The method may arrange topics in the group based on an individual preference of the particular user. The method may also generate a discover page in which the particular user selects a location, a profile image and/or an initial write up of the group.

The method may add a new user to the group when an administrator user of the group enters identification information associated with the new user. The identification information may be a phone number and an email address of the new user. The method may permit the particular user, the administrator user and/or the different user to generate a poll data to other members of the group. The method may process a payment of any member of the group responded to a payment request for a financial account associated with the administrator user of the group. The method may schedule an event and an appointment based on the poll data and may permit the administrator user to mark a topic and/or a thread of the group as a protected conversation accessible only to administrator users of the group. The method may lock the group such that only the administrator user will be permitted to post announcements in the group. The method may automatically permit any user of the group to pan to a top of the group. The method may centrally manage a set of a group of photos and/or videos in the group. The method may also permit any user of the group to pan to a top of the thread of the group. The method may further filter messages of the group based on a count of a number of like indicators users have placed on individual posts in the group.

In another embodiment, a method of a geo-spatial group's server includes verifying a particular user based on a verification code of the particular user placed through a mobile device communicatively coupled to the geo-spatial groups server. The method creates a group tied to a geo-spatial vicinity surrounding a current geo-spatial location of the mobile device. The method automatically denies a requester user access to the group when the requestor user is outside an outer boundary of the geo-spatial vicinity surrounding the current geo-spatial location of the mobile device. The method associates a name identifier for the group and permits a different user in the geo-spatial vicinity surrounding the current geo-spatial location of the mobile device to access the group. The method permits the different user to communicate with the particular user through the group. The method adds the different user to the group and opens a group chat session between the different user and other members of the group while the different user in the geo-spatial vicinity surrounding the group tied to the geospatial vicinity.

In yet another aspect, a system includes a geo-spatial groups server to verify a particular user based on a verification code of the particular user placed through a mobile device communicatively coupled to the geo-spatial groups server.

The system creates a group tied to a geo-spatial vicinity surrounding a current geo-spatial location of the mobile device. The system associates a name identifier for the group and automatically denies a requester user access to the group when the requestor user is outside an outer boundary of the geo-spatial vicinity surrounding the current geo-spatial location of the mobile device. The system permits a different user in the geo-spatial vicinity surrounding the current geo-spatial location of the mobile device to access the group. The system includes a network and a mobile device communicatively coupled with the geo-spatial groups server through the network to access the geo-spatial groups server through the network and to create the group tied to the geo-spatial vicinity surrounding the current geo-spatial location of the mobile device.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 7 is a table view of groups within a network along with their description, member count, latitude, and longitude, according to one embodiment.

Other features of the present embodiments will be apparent from the accompanying drawings and from the detailed description that follows.

DETAILED DESCRIPTION

Disclosed are a method, a device, and/or a system of interaction between groups surrounding a present geo-spatial location of a mobile device. Although the present embodiments have been described with reference to specific example embodiments, it will be evident that various modifications and changes may be made to these embodiments without departing from the broader spirit and scope of the various embodiments.

Figure 1:
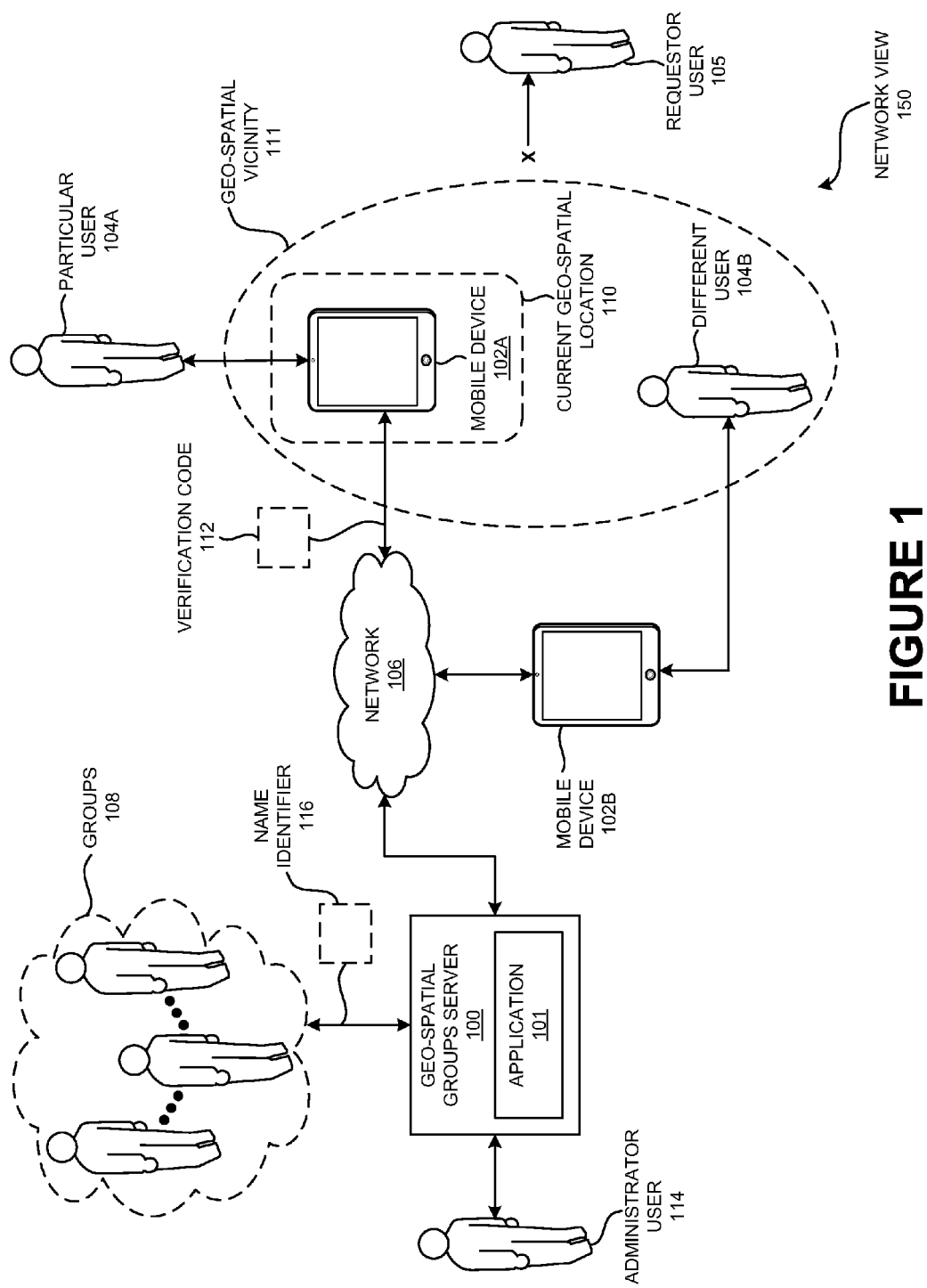
FIG. 1 is a network view of groups surrounding a geo-spatial location of a mobile device, according to one embodiment.

FIG. 1 is a network view of groups surrounding a geo-spatial location of a mobile device, according to one embodiment.

Particularly, FIG. 1 illustrates a network view 150, according to one embodiment. The embodiment of FIG. 1 describes a geo-spatial groups server 100, an application 101, a mobile device 102A, a particular user 104A, a different user 104B, a requestor user 105, a network 106, a groups 108, a current geo-spatial location 110, a geo-spatial vicinity 111, a verification code 112, an administrator user 114, and a name identifier 116.

The geo-spatial groups server 100 includes an application 101, according to the embodiment of FIG. 1. The geo-spatial groups server 100 may be one or more server side data processing systems (e.g., web servers operating in concert with each other) that operate in a manner that provide a set of instructions to any number of client side devices (e.g., a mobile device 102A and/or mobile device 102B) communicatively coupled with the geo-spatial groups server 100 through the network 106. For example, the geo-spatial groups server 100 may be a computing system (e.g., or a group of computing systems) that operates in a larger client-server database framework (e.g., such as in a network group surround a present geo-spatial location, etc.). The network 106 may be a group of two or more computer systems linked together (e.g., local-area network (LAN), wide-area network (WAN), campus-area network (CAN), etc.)

The application 101 may be an application software designed to run on smartphones, tablet computers, and other mobile devices. In addition, the application 101 may be available through an application distribution platform (e.g., the Apple® App Store, Google® Play, etc.).

The mobile device 102A and/or mobile device 102B (e.g., a smartphone, a tablet, a laptop) may access the geo-spatial groups server 100 through the network 106 using a browser application of the mobile device 102A and/or mobile device 102B (e.g., Google® Chrome) and/or through a client-side application downloaded to the mobile device 102A and/or mobile device 102B operated by a particular user 104A, a different user 104B.

The groups 108 may be a multitude of smaller groups comprising of users and members 302 (FIG. 3) within an individual group. A group may be a number of users and other members 302 who are considered or classed together. The name identifier 116 may be a word or set of words by which an individual group identifies itself. The groups 108 may be associated with a name identifier 116 either through an automatic naming identification process by the geo-spatial groups server 100 or a manual naming identification process by members 302 of the groups 108 (e.g., the administrator user 114). Members 302 of the groups 108 may be a particular user 104A, a different user 104B, a requestor user 105, and/or an administrator user 114. The particular user 104A and different user 104B may be users within the group. The requester user 105 may be a user outside of the group who wishes to join the group. The administrator user 114 may be a managing user of the group.

The groups 108 may be within a geo-spatial vicinity 111 surrounding a current geo-spatial location 110 of the mobile device 102A. The geo-spatial vicinity 111 may be an area near or surrounding a particular location. The current geo-spatial location 110 may be a particular place or position (e.g., a classroom, a dining hall, etc.). The mobile device 102A of a requestor user 105 operated by the requestor user 105 may wish to join the groups 108. An administrator user 114 may verify the requestor user 105 based on a verification code 112 of the requestor user 105 placed through the mobile device 102A communicatively coupled to the geo-spatial groups server 100 through the network 106. The verification code 112 may a security code used to confirm the identity of the requester user 105 before the administrator user 114 allows the requester user 105 to join the group.

Figure 2:
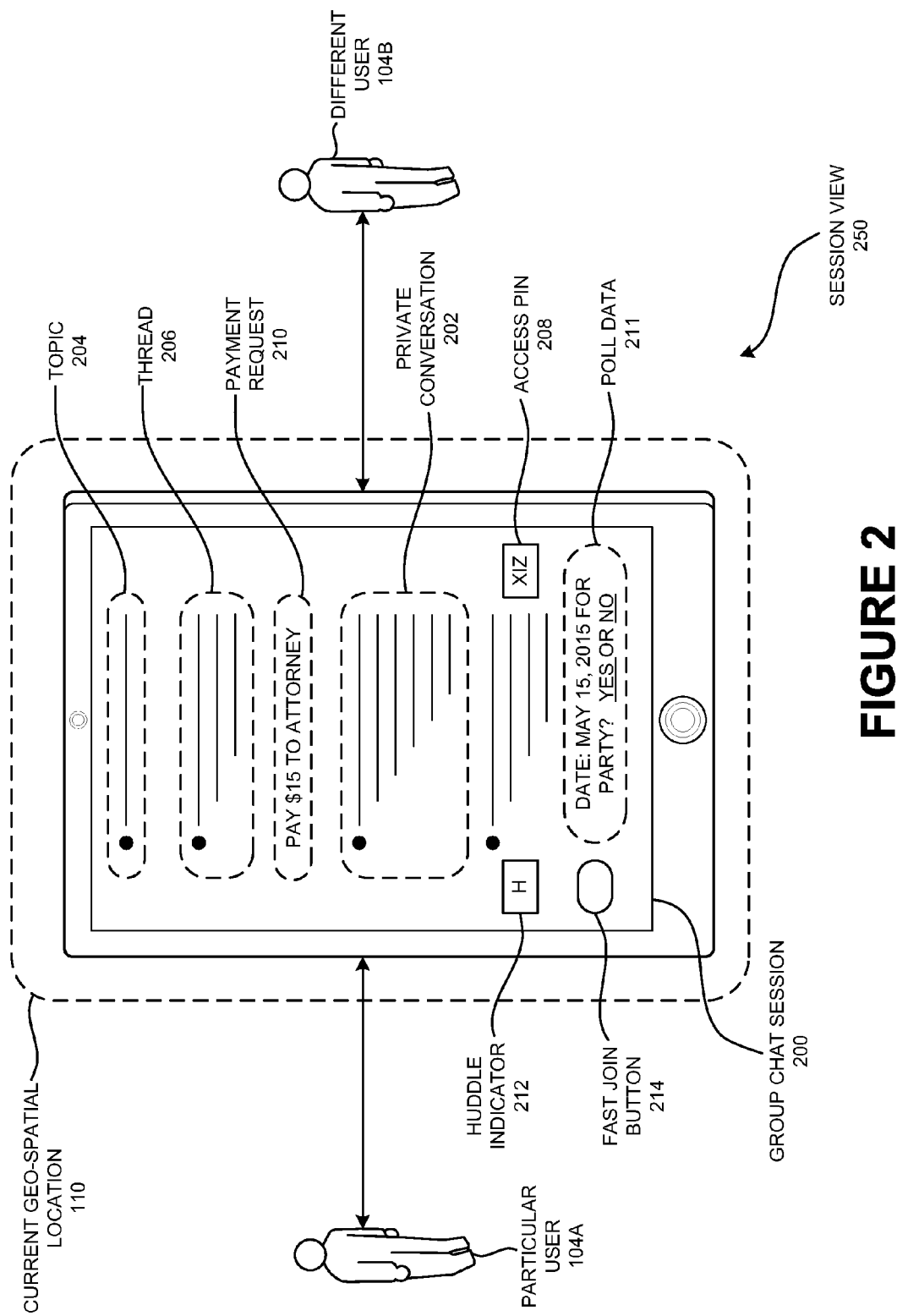
FIG. 2 is a session view of a mobile device within a current geo-spatial location depicting how users of a group chat session may interact through the user interface, according to one embodiment.

FIG. 2 is a session view of a mobile device within a current geo-spatial location depicting how users of a group chat session may interact through the user interface, according to one embodiment.

Particularly, FIG. 2 shows a session view 250, according to one embodiment. The embodiment of FIG. 2 describes a particular user 104A, a different user 104B, a current geo-spatial location 110 from FIG. 1, a group chat session 200, a private conversation 202, a topic 204, a thread 206, an access pin 208, a payment request 210, a poll data 211, a huddle indicator 212, and a fast join button 214, The session view 250 may be a user interface of a mobile device 102A and/or mobile device 102B located within a current geo-spatial location 110. The user interface may be a program that controls a display for a user, typically on a computer monitor, and that allows the user to interact with the system. A particular user 104A may be the owner of the mobile device 102A and/or mobile device 102B, who may be interacting with a different user 104B and other members 302 of groups 108 through a group chat session 200. The group chat session 200 may be a feature that lets users and members 302 communicate amongst themselves at any particular time.

The group chat session 200 may comprise of a topic 204 arranged in the group based on individual preferences of the particular user 104A. The topic 204 may be a matter dealt with in a text, discourse, or conversation. The group chat session 200 may permit the different user 104B to mute the particular user 104A, a thread 206, and/or a topic 204 in groups 108. The thread 206 may be a chain of written ideas or opinions exchanged among two or more users and members 302 in a discussion, which are normally linked in the sequence in which they were espoused by the users and members 302. An administrator user 114 may be able to mark a topic 204 and a thread 206 of groups 108 as a protected conversation 202. The protected conversation 202 may be a conversation that is only accessible to the administrator user 114 of groups 108.

Figure 3:
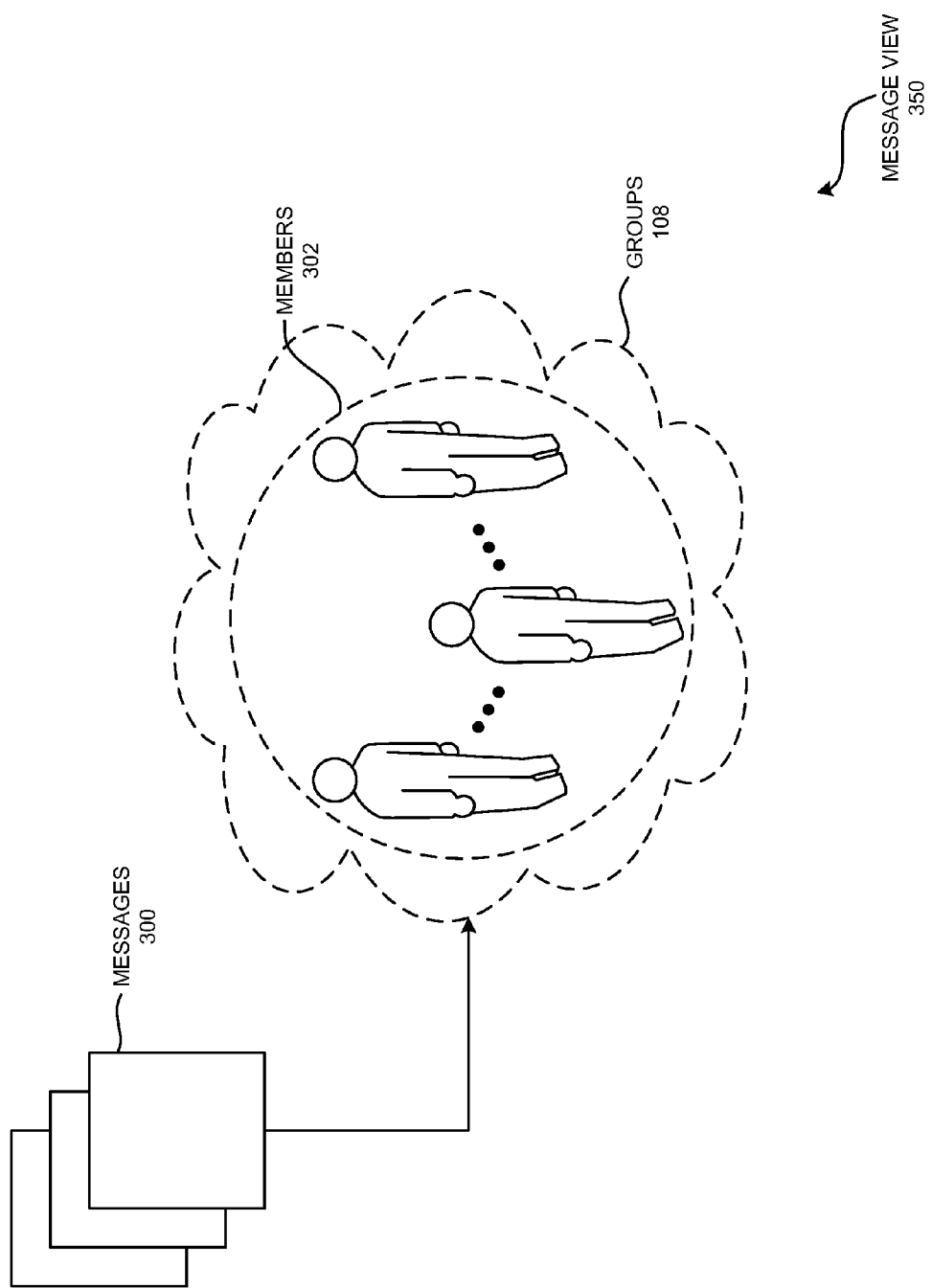
FIG. 3 is a message view illustrating how members of groups may receive messages, according to one embodiment.

A payment request 210 of members 302 from FIG. 3 may be processed for a financial account associated with the administrator user 114 of groups 108.

The group chat session 200 may also permit a private conversation 202 between different user 104B and other members 302 of groups 108. The different user 104B and other members 302 may be able to mute a particular user 104A, a thread 206, and/or a topic 204 in the group chat session 200.

The geo-spatial groups server 100 may generate an access pin 208, which may be displayed on the group chat session 200. The access pin 208 may be any combination of numbers, letters, and symbols used to gain access to the group chat session 200. The different user 104B may be able to enter the access pin 208 to access a group even when the user is not in the geo-spatial vicinity 111 surrounding the group.

A poll data 211 may be generated by any of the particular user 104A, the administrator user 114, and the different user 104B to other members 302 of the group. The poll data 211 may be a sampling or collection of opinions on a subject taken from the users and members 302 of the group chat session 200. The group chat session 200 may allow the scheduling of an event and/or an appointment based on the poll data 211 and may permit the administrator user 114 to mark a topic 204 and/or a thread 206 of the group as a protected conversation 202 accessible only to the administrator user 114 of the group.

A huddle indicator 212 may be a button on the user interface of the group chat session 200 that allows the easy adding of a group of users to contact lists of other users and members 302. A huddle may be a densely packed group or crowd of requester user 105 who may wish to join the group chat session 200. When each user of a group chat session 200 depresses the huddle indicator 212 on their respective mobile device 102A and/or mobile device 102B, any number of users and individuals who have downloaded an application 101 associated with the geo-spatial groups server 100 may add each other to their respective contact lists when they are a distance away from each other (e.g., maximum of 5 yards).

The group chat session 200 may also automatically permit the administrator user 114 to add other users who have depressed a fast join button 214 on the application 101 when the other users are a distance away from each other (e.g., maximum of 5 yards). The fast join button 214 may be an area on a mobile device 102A that may be clicked on in order to perform the action of adding other users.

FIG. 3 is a message view illustrating how members of groups may receive and send messages, according to one embodiment.

Particularly, FIG. 3 illustrates a message view 350, according to one embodiment. The embodiment of FIG. 3 describes a groups 108, a members 302, and a messages 300.

Members 302 may be users (e.g., different user 104B, requester user 105, administrator user 114, etc.) of groups 108. Messages 300 may be any vessel of communication which provides information (e.g., text, audio, etc.). Members 302 of groups 108 may be able to generate and distribute messages 300 to other members 302 of groups 108 when they are in the geo-spatial vicinity 111 of their respective group. Messages 300 to other members 302 may also be withheld when the members 302 of groups 108 are outside the geo-spatial vicinity 111 of their respective group. Additionally, messages 300 of groups 108 may be filtered based on a count of a number of like indicators users have placed on individual posts in the group.

Figure 4:
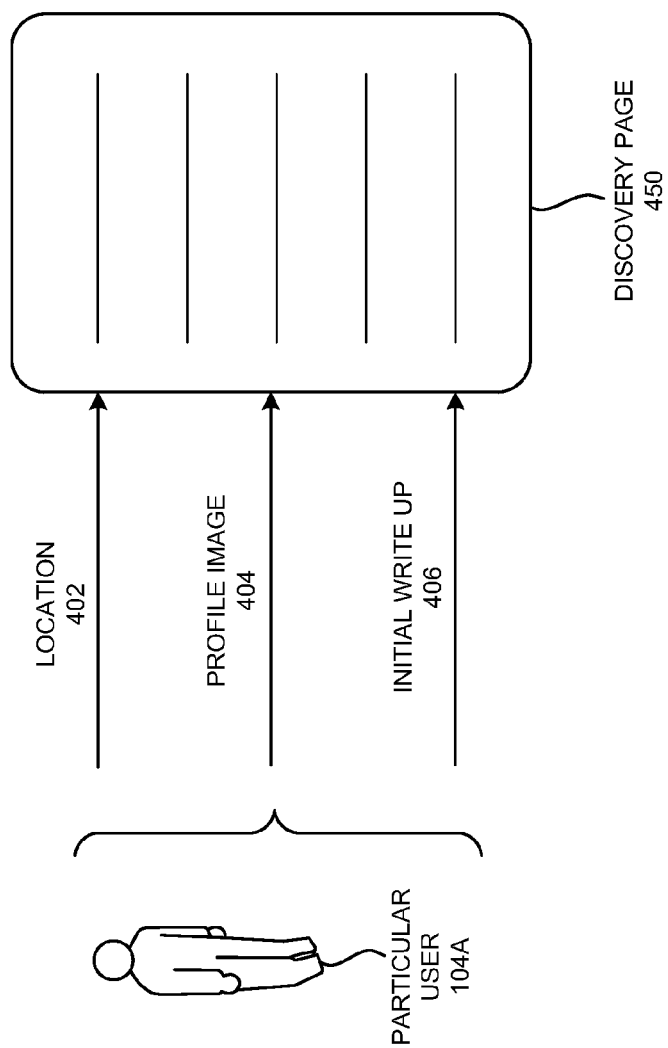
FIG. 4 is an illustration of an individual preference of a particular user who generates a discovery page in which the particular user selects a location, profile image, and initial write up of the group, according to one embodiment.

FIG. 4 is an illustration of an individual preference of a particular user who generates a discovery page in which the particular user selects a location, profile image, and initial write up of the group, according to one embodiment.

Particularly, FIG. 4 illustrates a discovery page 450, according to one embodiment. The embodiment of FIG. 4 describes a particular user 104A, a location 402, a profile image 404, and an initial write up 406.

A particular user 104A of groups 108 of a geo-spatial groups server 100 may generate a discovery page 450 in which the particular user 104A may select a location 402, a profile image 404, and an initial write up 406 of their respective group. The discovery page 450 may be any type of informational sheet used for the disclosure of an individual group within the groups 108. The location 402 may be any particular place or position. The profile image 404 may be any picture that represents a user and members 302 within the groups 108. The initial write up 406 may be any report or description of an individual group within the groups 108. The particular user 104A may be able to rearrange these headers based on their personal preference.

Figure 5:
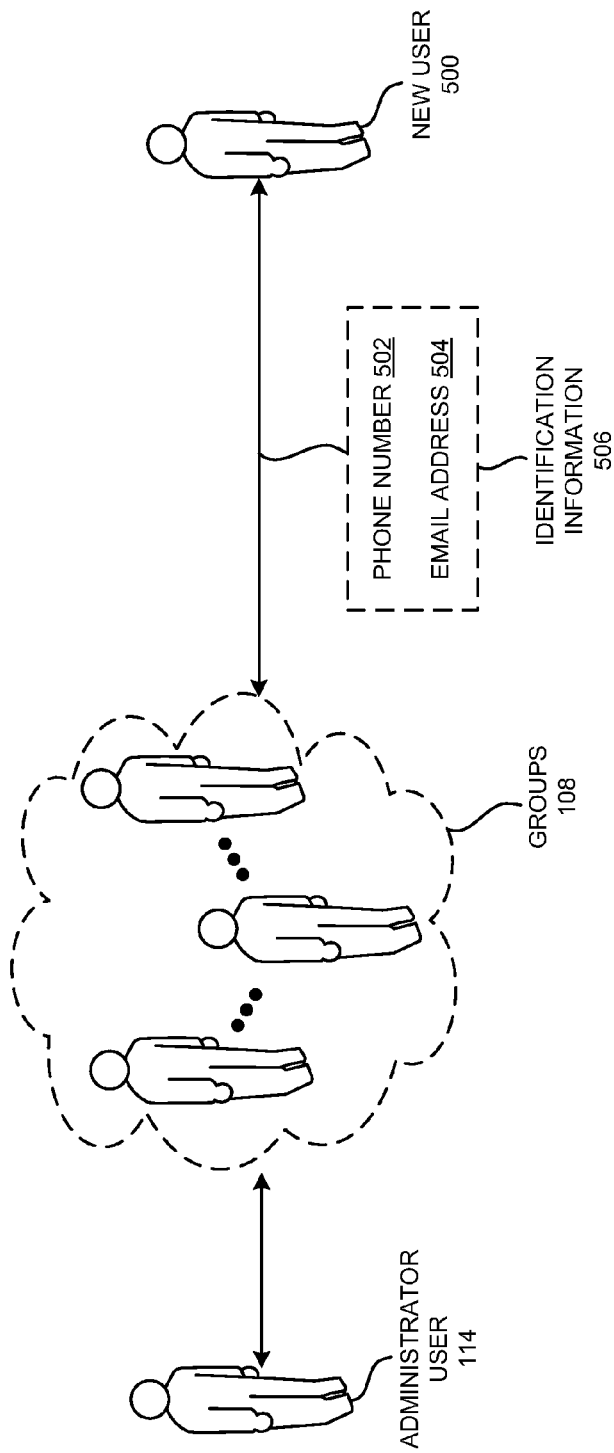
FIG. 5 is a depiction of an administrator user adding a new user to groups by entering identification information associated with the new user, according to one embodiment.

FIG. 5 is a depiction of an administrator user adding a new user to groups by entering identification information associated with the new user, according to one embodiment.

Particularly, FIG. 5 describes a group 108, an administrator user 114, a new user 500, a phone number 502, an email address 504, and an identification information 506.

An administrator user 114 may be part of a group 108, wherein a new user 500 wishes to become a new member. The new user 500 may be a user who has recently joined groups 108 and who was not previously a member 302. The administrator user 114 may be able to add the new user 500 to groups 108 when the administrator user 114 of their respective group enters identification information 506 associated with the new user 500. Identification information 506 may be a representation used to recognize or establish as being a particular person (e.g., potential user). The identification information 506 may be a phone number 502 and/or an email address 504 of the new user 500.

Figure 6:
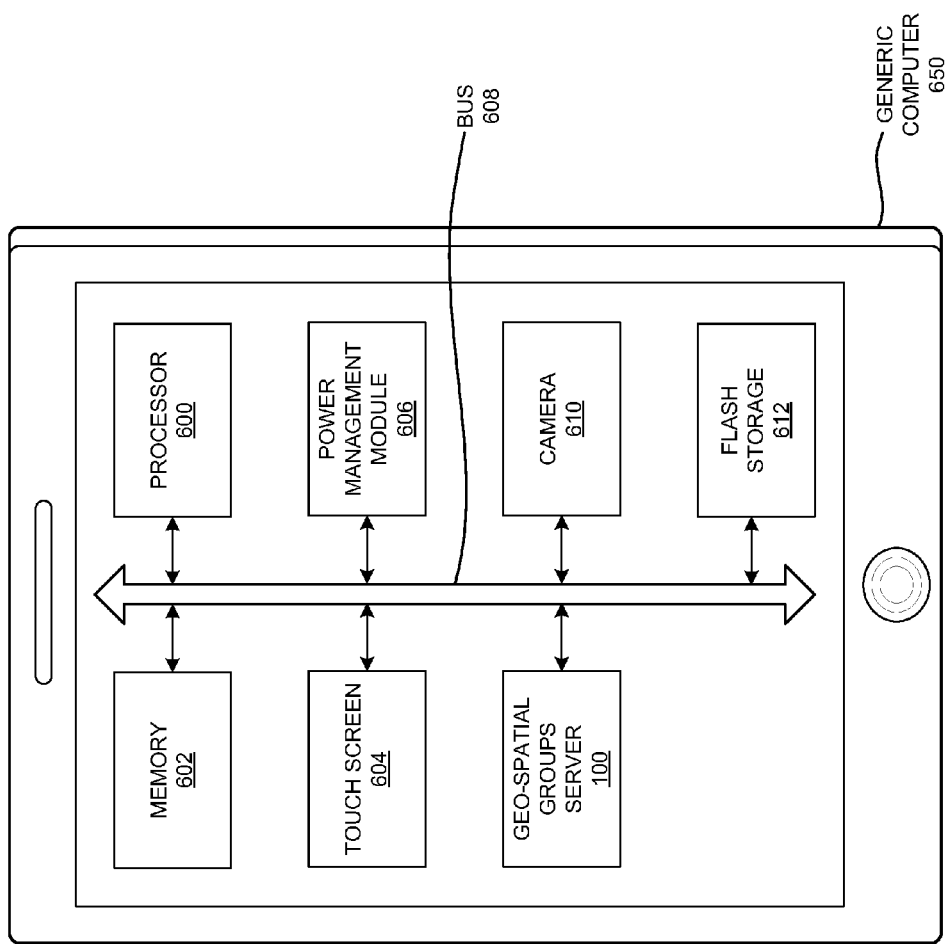
FIG. 6 is an internal hardware view of a generic computer used to access a network of groups surrounding a geo-spatial location, according to one embodiment.

FIG. 6 is an internal hardware view of a generic computer used to access a network of groups surrounding a geo-spatial location, according to one embodiment.

Particularly, FIG. 6 illustrates a generic computer 650, according to one embodiment. The embodiment of FIG. 6 describes a geo-spatial groups server 100, a processor 600, a memory 602, a touch screen 604, a power management module 606, a bus 608, a camera 610, and a flash storage 612.

The generic computer 650 may comprise a processor 600 and a geo-spatial groups server 100. The processor 600 may be any hardware that performs the instructions of a computer program by carrying out the basic arithmetical, logical, and input/output operations of the generic computer 650. There may be one or more processor 600 working in concert to perform a common task. The processor 600 may be any microprocessor, multiprocessor, integrated circuit, and/or multi-core processor, and may comprise an arithmetic logic unit (ALU) and/or a control unit (CU). The processor 600 and the geo-spatial groups server 100 may be communicatively coupled to the bus 608 of the generic computer 650.

The memory 602 may be any physical device that stores computer programs and/or data on a temporary and/or permanent basis. The memory 602 may be primary memory (e.g., RAM), secondary memory (e.g., physical devices for program and data storage), and/or cache memory, and may be manufactured from semiconductor material. The memory 602 may also be a volatile memory and/or non-volatile memory, and may comprise of one or more physical devices. The memory 602 may be communicatively coupled to the bus 608 of the generic computer 650.

The touch screen 604 may be any electronic visual device that a user can control through simple or multi-touch gestures by touching the screen with a stylus, a pen, a single finger, or multiple fingers. The screen may be a surface of an electronic device on which images and data are displayed (e.g., CRT, LCD, plasma screens, etc.). The touch screen 604 may be communicatively coupled to the bus 608 of the generic computer 650.

The power management module 606 may be any electronic controller that governs power functions of electronic devices. The power management module 606 may comprise an analog to digital converter to measure the voltages of the main battery or power source of the generic computer 650. The power management module 606 may be communicatively coupled to the bus 608 of the generic computer 650.

The camera 610 may be an optical instrument that records images that can be stored directly and/or transmitted to another location. The images may be still photographs or moving images such as videos and/or movies. The camera 610 may be communicatively coupled to the bus 608 of the generic computer 650.

The flash storage 612 may be an electronic non-volatile computer storage medium that may be erased and/or reprogrammed (e.g., USB flash drives, memory cards, solid-state drives, etc.). The flash storage 612 may be of the NAND and/or NOR logic gates type. The flash storage 612 may be communicatively coupled to the bus 608 of the generic computer 650.

The bus 608 may be a communication system that transfers data between components inside the generic computer 650 and may also allow for the transfer of data between another or multiple computers (e.g. USB, FireWire, SATA, etc.). The bus 608 may be an internal bus that connects all the internal components of a computer, such as CPU and memory, to the motherboard. It may also be an external bus that is made up of the electronic pathways that connect the different external devices, such as a printer, scanner, and etc. The bus 608 may span the length of the generic computer 650 and may FIG. 7 is a table view of groups within a network along with their description, member count, latitude, and longitude, according to one embodiment.

Particularly, FIG. 7 describes an initial write up 406, a group name 700, a description 702, a member count 704, a latitude 706, a longitude 708.

The group name 700 may be a word or set of words by which a group identifies itself (e.g., UCLA Bruins, Tarheels, Mrs. Blake's Students, etc.). The description 702 may be a written representation of the group and may comprise of the initial write up 406. The member count 704 may be a numerical representation that signifies the amount of members 302 belonging to a group. The latitude 706 may be the angular distance of the location of the group north or south of the earth's equator. The latitude may be expressed in degrees and/or minutes. The longitude 708 may be the angular distance of the location of the group measured east or west of the prime meridian at Greenwich, England, to the meridian passing through a position. The longitude 708 may be expressed in degrees (or hours), minutes, and/or seconds.

Figure 8:
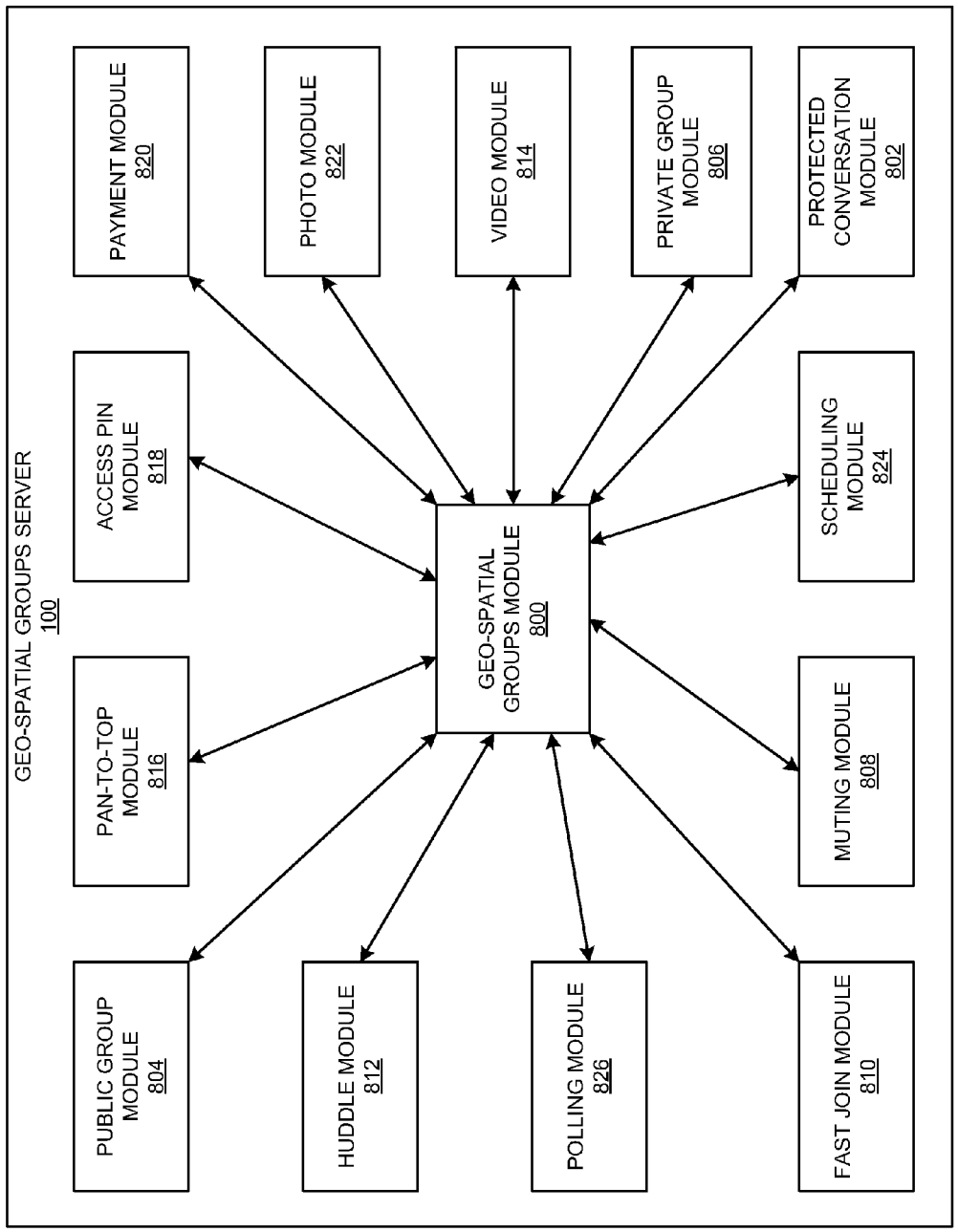
FIG. 8 is an exploded view of the geo-spatial groups server of FIG. 1, according to one embodiment.

FIG. 8 is an exploded view of the geo-spatial groups server of FIG. 1, according to one embodiment.

Particularly, FIG. 8 describes a geo-spatial groups module 800, a public group module 804, a protected conversation module 802, a private group module 806, a muting module 808, a fast join module 810, a huddle module 812, a video module 814, a pan-to-top module 816, an access pin module 818, a payment module 820, a photo module 822, a scheduling module 824, and a polling module 826.

The geo-spatial groups module 800 may create a group tied to a geo-spatial vicinity surrounding a current geo-spatial location of a mobile device. It may also verify a particular user based on a verification code of the particular user placed through a mobile device communicatively coupled to the geo-spatial groups server. The geo-spatial groups module 800 may also automatically deny a requestor user access to the group when the requestor is outside an outer boundary of the geo-spatial vicinity surrounding the current geo-spatial location of the mobile device, and may associate a name identifier to the group.

The public group module 804 may permit different users to enter the access pin to access the group even when the user is not in the geo-spatial vicinity surrounding the group tied to the geo-spatial vicinity when the group is a public group. The protected conversation module 802 may permit the administrator user to a topic and/or thread of a group as a protected conversation accessible only to the administrator users of the group.

The private group module 806 may permit the different user to enter the access pin to find the group even when the user is not in the geo-spatial vicinity surrounding the group tied to the geo-spatial vicinity when the group is a private group. The muting module 808 may permit the different user to mute at least one of the particular user, a thread, and a topic in the group.

The fast join module 810 may automatically permit the administrator user to add other users who have depressed a fast join button on the application when the other users are in the maximum 5 yard distance from a location of the administrator user. The huddle module 812 may allow a particular user and any number of other users and individuals who have downloaded the application associated with the geo-spatial group server to add each other to respective contact lists in each other's mobile devices when each user depresses the huddle indicator on their respective mobile devices simultaneously and are in a maximum 5 yards distance from each other.

The video module 814 may centrally manage a set videos in a group. The pan-to-top module 816 may automatically permit any user of a group to pan to the top of the group, and may also permit any user of the group to pan to the top of the thread of a group. The access pin module 818 may generate an access pin of a group, and may also permit a user to enter the access pin to access a group even when the user is not in the geo-spatial vicinity surrounding the group.

The payment module 820 may process a payment of any member of a group responsive to a payment request to a financial account associated with the administrator user of a group. The photo module 822 may centrally manage a set of photos in a group. The scheduling module 824 may allow for the scheduling of an event and/or an appointment based on poll data. The polling module 826 may permit a user to generate poll data to other members in a group.

In one embodiment, a method of a geo-spatial groups server 100 includes verifying a particular user 104A based on a verification code 112 of the particular user 104A placed through a mobile device 102A communicatively coupled to the geo-spatial groups server 100. The method involves creating a group tied to a geo-spatial vicinity 111 surrounding a current geo-spatial location 110 of the mobile device 102A, associating a name identifier 116 to the group, and permitting a different user 104B in the geo-spatial vicinity 111 surrounding the current geo-spatial location 110 of the mobile device 102A to access the group. In one or more embodiments, the method of the geo-spatial groups server 100 also involves automatically denying a requester user access to the group when the requestor user 105 is outside an outer boundary of the geo-spatial vicinity 111 surrounding the current geo-spatial location 110 of the mobile device 102A.

The method that may allow permitting the different user 104B to communicate with the particular user 104A through the group, adding the different user 104B to the group, and opening a group chat session 200 between the different user 104B and other members 302 of the group while the different user 104B in the geo-spatial vicinity 111 surrounding the group is tied to the geospatial vicinity. In one or more embodiments, the method may also involve permitting a private conversation between the different user 104B and other members 302 of the group, and permitting the different user 104B to mute at least one of the particular user 104A, a thread, and a topic in the group.

The method may include generating an access pin of the group and permitting the different user 104B to enter the access pin to access the group even when the user is not in the geo-spatial vicinity 111 surrounding the group tied to the geo-spatial vicinity 111 when the group is a public group. In one or embodiments, the method may comprise permitting the different user 104B to enter the access pin to find the group even when the user is not in the geo-spatial vicinity 111 surrounding the group tied to the geo-spatial vicinity 111 when the group is a private group that is responsive to the particular user 104A and any number of other users and individuals who have downloaded an application 101 associated with the geo-spatial group server to add each other to respective contact lists in each other's mobile device 102As when each user depresses a huddle indicator on their respective mobile device 102As simultaneously and are in a maximum five yard distance from each other. In another embodiment, the method may also include automatically permitting an administrator user 114 to add other users who have depressed a fast join button on the application 101 when the other users are in the maximum five yard distance from a location 402 of the administrator user 114.

The method may further comprise generating messages 300 to members 302 of the group when the members 302 of the group only when the members 302 are in the geo-spatial vicinity 111 of the group, distributing the messages 300 to members 302 of the group when the members 302 of the group only when the members 302 are in the geo-spatial vicinity 111 of the group, and withholding the messages 300 to members 302 of the group when the members 302 of the group only when the members 302 are outside the geo-spatial vicinity 111 of the group.

Further, the method may comprise arranging topics in the group based on an individual preference of the particular user 104A and generating a discover page in which the particular user 104A selects a location 402, a profile image 404, and an initial write up 406 of the group. The method may also involve adding a new user to the group when an administrator user 114 of the group enters an identification information associated with the new user, wherein the identification information comprising at least one of a phone number and an email address of the new user and permitting any one of the particular user 104A, the administrator user 114, and the different user 104B to generate a poll data to other members 302 of the group.

In one or more embodiments, the method may include processing a payment of any member of the group responsive to a payment request to a financial account associated with the administrator user 114 of the group, scheduling at least one of an event and an appointment based on the poll data, and permitting the administrator user 114 to mark at least one of a topic and a thread of group as a protected conversation accessible only to administrator user 114 of group.

The method may further comprise locking the group such that only the administrator user 114 is permitted to post announcements in the group, automatically permitting any user of the group to pan to a top of the group, centrally managing a set of at least one of a group of photos and videos in the group, permitting any user of the group to pan to a top of the thread of the group, and filtering messages 300 of the group based on a count of a number of like indicators users have placed on individual posts in the group.

In another embodiment, a method of a geo-spatial groups server 100 comprises verifying a particular user 104A based on a verification code 112 of the particular user 104A placed through a mobile device 102A communicatively coupled to the geo-spatial groups server 100, creating a group tied to a geo-spatial vicinity 111 surrounding a current geo-spatial location 110 of the mobile device 102A, automatically denying a requester user access to the group when the requestor user 105 is outside an outer boundary of the geo-spatial vicinity 111 surrounding the current geo-spatial location 110 of the mobile device 102A, and associating a name identifier 116 to the group;

In one or more embodiments, the method may allow permitting a different user 104B in the geo-spatial vicinity 111 surrounding the current geo-spatial location 110 of the mobile device 102A to access the group, permitting the different user 104B to communicate with the particular user 104A through the group, adding the different user 104B to the group, and opening a group chat session 200 between the different user 104B and other members 302 of the group while the different user 104B in the geo-spatial vicinity 111 surrounding the group tied to the geo-spatial vicinity 111.

The application also discloses a system comprising a geo-spatial groups server 100 to verify a particular user 104A based on a verification code 112 of the particular user 104A placed through a mobile device 102A communicatively coupled to the geo-spatial groups server 100 to create a group tied to a geo-spatial vicinity 111 surrounding a current geo-spatial location 110 of the mobile device 102A.

The system also allows the geo-spatial groups server 100 to associate a name identifier 116 to the group, to automatically deny a requester user access, and to the group when the requestor user 105 is outside an outer boundary of the geo-spatial vicinity 111 surrounding the current geo-spatial location 110 of the mobile device 102A, and to permit a different user 104B in the geo-spatial vicinity 111 surrounding the current geo-spatial location 110 of the mobile device 102A to access the group.

Joe Bruin is a student at UCLA and is enrolled in an immunology and molecular genetics class. Professor Baum assigns a group project to the entire class to periodically collect blood samples from each member of a group and determine whether the amount of transient bacteria circulating within the human body fluctuates depending on certain criteria, such as: time of day, before and after meals, before and after exercising, and etc. Joe's group consists of 19 other students, and he is the elected group leader.

Joe is quickly finding out that it is extremely difficult coordinating the schedules, and assigning tasks, of every member to figure out the best time to have group meetings. Certain members cannot meet after class because they have to run to another class; certain members cannot meet before class for various reasons; some leave campus for the weekends to go home to their families; and etc. Frustrated, Joe decides to scour the web for ideas.

Fortunately for Joe, he stumbles upon a mobile application that will allow him to easily form groups, send messages, and create chat sessions, among other features. Without hesitation, he downloads the application, creates a group, and calls it "The Dirty Microbe". The next day in class, Joe instructs all of his group members to download the application as well. Once they all have downloaded the application, Joe, who is the administrator user of the group efficiently adds the rest of the group members into The Dirty Microbe by instructing them to depress the "fast join button" on their mobile application. Additionally, he instructs them to depress the "huddle indicator" on their mobile application so that each member will instantaneously exchange contact information. Since the fast join button and huddle indicator is only effective within a certain geo-spatial vicinity (e.g., a distance of 5 yards), he adds the rest of the group members who were not present in class that day by entering an "access pin". This feature allowed Joe to add members who are outside of the geo-spatial vicinity of the group.

Now that Joe has successfully and efficiently created his group, The Dirty Microbe, he can now schedule meetings through the mobile application. Joe is able to send out "polls" to the group for them to vote on best days, times, and location to periodically meet. However, and as expected, there are always members of the group who are unable to attend the meetings. Luckily for Joe, he is able to send messages, alerts, notifications, and etc. to all members of The Dirty Microbe, regardless if they were present or not.

One day in his dorm room, Joe was feeling happy and decided he wanted to be a little creative. He adds personality to The Dirty Microbe by filling out the "discovery page" for the group. Joe fabricated an initial write up for the group, filled in the group name, its member count, and etc. He then instructs the rest of the group members to fill out their own user discovery page and to upload a profile image so that every member can quickly learn each other's faces.

At the end of the group project, Joe feels elated that the administrative task of gathering the group went as smoothly as it did. He owed thanks to the mobile application.

In one or more embodiments, the system may comprise a network 106 and a mobile device 102A communicatively coupled with the geo-spatial groups server 100 through the network 106 to access the geo-spatial groups server 100 through the network 106 and to create the group tied to the geo-spatial vicinity 111 surrounding the current geo-spatial location 110 of the mobile device 102A.

What is claimed is:

1. A method of a geo-spatial groups server, comprising:
the geo-spatial groups server and a processor;
verifying a particular user based on a verification code of the particular user placed through a mobile device communicatively coupled to the geo-spatial groups server;
creating a group tied to a geo-spatial vicinity surrounding a current geo-spatial location of the mobile device;
associating a name identifier to the group; permitting a different user in the geo-spatial vicinity surrounding the current geo-spatial location of the mobile device to access the group;
automatically denying a requester user access to the group when the requester user is outside an outer boundary of the geo-spatial vicinity surrounding the current geo-spatial location of the mobile device; generating an access pin of the group; permitting the different user to enter the access pin to access the group even when the different user is not in a geo-spatial vicinity surrounding the group tied to the geo-spatial vicinity when the group is a public group;
permitting the different user to enter the access pin to find the group even when the different user is not in the geo-spatial vicinity surrounding the group tied to the geo-spatial vicinity when the group is a private group, responsive to the particular user and any number of other users and individuals that have downloaded an application associated with the geo-spatial groups server to add each other to respective contact lists in mobile devices thereof when each user depresses a huddle indicator on the respective mobile devices thereof simultaneously and is in a maximum five yard distance from each other; and automatically permitting an administrator user to add the other users that have depressed a fast join button on the application when the other users are in the maximum five yard distance from a location of the administrator user.

2. The method of claim 1, further comprising:
permitting the different user to communicate with the particular user through the group; and
adding the different user to the group.

3. The method of claim 2, further comprising:
permitting a private conversation between the different user and other members of the group; and
permitting the different user to mute at least one of the particular user, a thread, and a topic in the group.

4. The method of claim 2, further comprising:
opening a group chat session between the different user and other members of the group while the different user is in the geo-spatial vicinity surrounding the group tied to the geo-spatial vicinity.

5. The method of claim 1, further comprising:
generating messages to members of the group only when the members of the group are in the geo-spatial vicinity of the group;
distributing the messages to the members of the group only when the members of the group are in the geo-spatial vicinity of the group; and
withholding the messages to the members of the group only when the members of the group are outside the geo-spatial vicinity of the group.

6. The method of claim 1, further comprising:
arranging topics in the group based on an individual preference of the particular user; and
generating a discover page in which the particular user selects a location, a profile image, and an initial write up of the group.

7. The method of claim 1, further comprising:
adding a new user to the group when the administrator user enters an identification information associated with the new user, wherein the identification information comprises at least one of a phone number and an email address of the new user;
permitting any one of the particular user, the administrator user, and the different user to generate poll data to other members of the group;
processing a payment of any member of the group responsive to a payment request to a financial account associated with the administrator user;
scheduling at least one of an event and an appointment based on the poll data; and
permitting the administrator user to mark at least one of a topic and a thread of the group as a protected conversation accessible only to administrator users of the group.

8. The method of claim 5, further comprising:
locking the group such that only the administrator user is permitted to post announcements in the group;
automatically permitting any user of the group to pan to a top of the group;
centrally managing a set of at least one of a group of photos and a group of videos in the group;
permitting any user of the group to pan to a top of a thread of the group; and
filtering the messages of the group based on a count of a number of like indicators users have placed on individual posts in the group.

9. A method of a geo-spatial groups server, comprising:
the geo-spatial groups server and a processor;
verifying a particular user based on a verification code of the particular user placed through a mobile device communicatively coupled to the geo-spatial groups server;
creating a group tied to a geo-spatial vicinity surrounding a current geo-spatial location of the mobile device; automatically denying a requester user access to the group when the requester user is outside an outer boundary of the geo-spatial vicinity surrounding the current geo-spatial location of the mobile device; associating a name identifier to the group; permitting a different user in the geo-spatial vicinity surrounding the current geo-spatial location of the mobile device to access the group; permitting the different user to communicate with the particular user through the group; adding the different user to the group; opening a group chat session between the different user and other members of the group while the different user is in a geo-spatial vicinity surrounding the group tied to the geo-spatial vicinity;
generating an access pin of the group, responsive to the particular user and any number of other users and individuals that have downloaded an application associated with the geo-spatial groups server to add each other to respective contact lists in mobile devices thereof when each user depresses a huddle indicator on the respective mobile devices thereof simultaneously and are in a maximum five yard distance from each other; automatically permitting an administrator user to add other users that have depressed a fast join button on the application when the other users are in the maximum five yard distance from a location of the administrator user; permitting the different user to enter the access pin to access the group even when the different user is not in the geo-spatial vicinity surrounding the group tied to the geo-spatial vicinity when the group is a public group; and permitting the different user to enter the access pin to find the group even when the different user is not in the geo-spatial vicinity surrounding the group tied to the geo-spatial vicinity when the group is a private group.

10. The method of claim 9, further comprising:
permitting a private conversation between the different user and the other members of the group.

11. The method of claim 10, further comprising:
permitting the different user to mute at least one of the particular user, a thread and a topic in the group.

12. The method of claim 9, further comprising:
generating messages to members of the group only when the members of the group are in the geo-spatial vicinity of the group;
distributing the messages to the members of the group only when the members of the group are in the geo-spatial vicinity of the group; and
withholding the messages to the members of the group only when the members of the group are outside the geo-spatial vicinity of the group.

13. The method of claim 9, further comprising:
arranging topics in the group based on an individual preference of the particular user;
generating a discover page in which the particular user selects a location, a profile image, and an initial write up of the group;
permitting any one of the particular user, the administrator user, and the different user to generate poll data to the other members of the group;
processing a payment of any member of the group responsive to a payment request to a financial account associated with the administrator user;
scheduling at least one of an event and an appointment based on the poll data; and
permitting the administrator user to mark at least one of a topic and a thread of group as a protected conversation accessible only to administrator users of the group.

14. The method of claim 12, further comprising:
adding a new user to the group when the administrator user enters an identification information associated with the new user, wherein the identification information comprises at least one of a phone number and an email address of the new user;

locking the group such that only the administrator user is permitted to post announcements in the group;
automatically permitting any user of the group to pan to a top of the group;
centrally managing a set of at least one of a group of photos and a group of videos in the group;
permitting any user of the group to pan to a top of a thread of the group; and
filtering the messages of the group based on a count of a number of like indicators users have placed on individual posts in the group.

15. A system, comprising:
a geo-spatial groups server and a processor:
to verify a particular user based on a verification code of the particular user placed through a mobile device communicatively coupled to the geo-spatial groups server, to create a group tied to a geo-spatial vicinity surrounding a current geo-spatial location of the mobile device, to associate a name identifier to the group, to automatically deny a requester user access to the group when the requester user is outside an outer boundary of the geo-spatial vicinity surrounding the current geo-spatial location of the mobile device, to permit a different user in the geo-spatial vicinity surrounding the current geo-spatial location of the mobile device to access the group, to generate an access pin of the group, to permit the different user to enter the access pin to access the group even when the different user is not in a geo-spatial vicinity surrounding the group tied to the geo-spatial vicinity, to permit any one of the particular user, an administrator user, and the different user to generate poll data to other members of the group, to process a payment of any member of the group responsive to a payment request to a financial account associated with the administrator user, to schedule at least one of an event and an appointment based on the poll data, and to permit the administrator user to mark at least one of a topic and a thread of group as a protected conversation accessible only to administrator users of the group; a network; and the mobile device communicatively coupled with the geo-spatial groups server through the network to access the geo-spatial groups server through the network and to create the group tied to the geo-spatial vicinity surrounding the current geo-spatial location of the mobile device.

16. The system of claim 15, wherein the geo-spatial groups server is further configured:
to permit the different user to communicate with the particular user through the group, and
to add the different user to the group.

17. The system of claim 15, wherein the geo-spatial groups server is further configured:
to permit a private conversation between the different user and other members of the group, and
to permit the different user to mute at least one of the particular user, a thread, and a topic in the group.

18. The system of claim 16, wherein the geo-spatial groups server is further configured:
to open a group chat session between the different user and the other members of the group while the different user is in the geo-spatial vicinity surrounding the group tied to the geo-spatial vicinity.

19. The system of claim 15, wherein the geo-spatial groups server is further configured:
to generate messages to members of the group only when the members of the group are in the geo-spatial vicinity of the group,
to distribute the messages to the members of the group only when the members of the group are in the geo-spatial vicinity of the group,
to withhold the messages to the members of the group only when the members of the group are outside the geo-spatial vicinity of the group,
to lock the group such that only the administrator user is permitted to post announcements in the group,
to automatically permit any user of the group to pan to a top of the group,
to centrally manage a set of at least one of a group of photos and a group of videos in the group,
to permit any user of the group to pan to a top of a thread of the group, and
to filter the messages of the group based on a count of a number of like indicators users have placed on individual posts in the group.

20. The system of claim 15, wherein the geo-spatial groups server is further configured:
to arrange topics in the group based on an individual preference of the particular user,
to generate a discover page in which the particular user selects a location, a profile image, and an initial write up of the group, and
to add a new user to the group when the administrator user enters an identification information associated with the new user, wherein the identification information comprises at least one of a phone number and an email address of the new user.

* * * * *